(12) United States Patent
Todorovic (10) Patent No.: US 10,054,007 B2
(45) Date of Patent: Aug. 21, 2018

(54) JOINT BETWEEN COMPONENTS

(71) Applicant: ROLLS-ROYCE DEUTSCHLAND LTD & CO KG, Blankenfelde-Mahlow, Dahlewitz (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 838 days.

(21) Appl. No.: 14/559,372

(22) Filed: Dec. 3, 2014

(65) Prior Publication Data

US 2015/0167498 A1 Jun. 18, 2015

(30) Foreign Application Priority Data

Dec. 13, 2013 (GB) .................................. 1322048.8

(51) Int. Cl.
*F01D 25/24* (2006.01)
*F01D 21/04* (2006.01)
(Continued)

(52) U.S. Cl.
CPC ........... *F01D 25/243* (2013.01); *B64D 33/02* (2013.01); *F01D 21/045* (2013.01); *F02C 7/28* (2013.01);
(Continued)

(58) Field of Classification Search
CPC .... F01D 21/045; F01D 25/243; F04D 29/526; F04D 29/644; B64D 33/02;
(Continued)

(56) References Cited

U.S. PATENT DOCUMENTS 3,952,973 A 4/1976 James
5,088,279 A * 2/1992 MacGee ................... F02C 7/20
60/226.1

(Continued)

FOREIGN PATENT DOCUMENTS

EP 2 299 067 A2 3/2011
EP 2 492 455 A2 8/2012
(Continued)

OTHER PUBLICATIONS

Apr. 30, 2015 European Search Report issued in European Patent Application No. 14 19 5746.
(Continued)

*Primary Examiner* — Igor Kershteyn
(74) *Attorney, Agent, or Firm* — Oliff PLC (57) ABSTRACT

A joint assembly between a first gas turbine engine casing and a second gas turbine casing, the first gas turbine engine casing having a plurality of circumferentially spaced attachment points and the second gas turbine casing having a plurality of circumferentially spaced attachment points for securing the first gas turbine casing and the second gas turbine casing together, wherein each attachment point on the first gas turbine casing is circumferentially offset from a respective attachment point on the second gas turbine casing, and connected by a flexure member that permits limited relative movement of the attachment point on the first gas turbine engine casing and its respective attachment point on the second gas turbine casing.

20 Claims, 5 Drawing Sheets

(51) Int. Cl.
  *F04D 29/64* (2006.01)
  *F04D 29/52* (2006.01)
  *B64D 33/02* (2006.01)
  *F02C 7/28* (2006.01)
  *F02C 7/04* (2006.01)

(52) U.S. Cl.
  CPC ......... *F04D 29/526* (2013.01); *F04D 29/644* (2013.01); *B64D 2033/0286* (2013.01); *F02C 7/04* (2013.01); *F05D 2220/36* (2013.01); *F05D 2230/60* (2013.01); *F05D 2260/38* (2013.01); *F05D 2300/501* (2013.01)

(58) Field of Classification Search
  CPC ...... B64D 2033/0286; F02C 7/04; F02C 7/28; F05D 2220/36; F05D 2230/60; F05D 2260/38; F05D 2300/501
  See application file for complete search history.

(56) References Cited

U.S. PATENT DOCUMENTS

| | | | |
|---|---|---|---|
| 5,226,288 | A | 7/1993 | Cornax |
| 5,737,913 | A | 4/1998 | Terry |
| 6,829,883 | B2 | 12/2004 | Sathianathan et al. |
| 2007/0031247 | A1 | 2/2007 | Spitzer et al. |
| 2010/0189552 | A1* | 7/2010 | Evans ................... F01D 21/045 415/182.1 |
| 2011/0048029 | A1* | 3/2011 | Watson ................... F01D 25/28 60/797 |
| 2011/0168839 | A1 | 7/2011 | Porte et al. |
| 2012/0111995 | A1 | 5/2012 | Lafont |
| 2012/0219358 | A1 | 8/2012 | Reed |
| 2012/0286126 | A1* | 11/2012 | Gallet ................... F01D 25/162 248/554 |
| 2013/0032669 | A1 | 2/2013 | Porte et al. |
| 2013/0037688 | A1* | 2/2013 | Bellabal ................... F02K 3/06 248/554 |

FOREIGN PATENT DOCUMENTS

| | | |
|---|---|---|
| EP | 2 538 035 A2 | 12/2012 |
| GB | 2 242 483 A | 10/1991 |
| GB | 2 384 829 A | 8/2003 |
| GB | 2467155 A | 7/2010 |
| GB | 2490781 A | 11/2012 |
| GB | 2493613 A | 2/2013 |
| WO | WO 2012/049478 A1 | 4/2012 |

OTHER PUBLICATIONS

British Search Report issued in British Patent Application No. GB1322048.8 dated Jul. 31, 2014.

* cited by examiner

JOINT BETWEEN COMPONENTS

The present disclosure relates to joints between annular components, such as casings of a gas turbine engine and particularly to joints between a fan case and an inlet nacelle barrel of a gas turbine engine.

Figure 1:
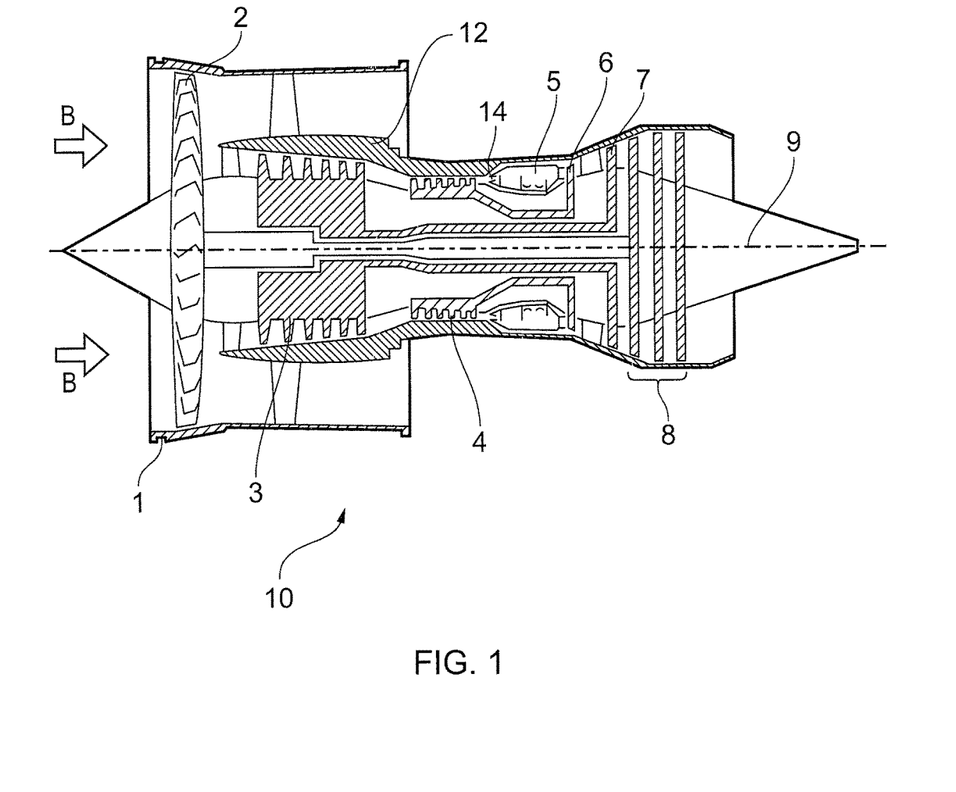
FIG. 1 depicts a ducted fan gas turbine engine.

With reference to FIG. 1, a ducted fan gas turbine engine generally indicated at 10 comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high, intermediate and low pressure turbines respectively drive the high and intermediate pressure compressors and the fan by suitable interconnecting shafts The fan casing acts as a structural containment which captures a blade in a fan-off event and dissipates the energy. The dissipating energy can cause deformation of the fan case in the form of a sinusoidal wave that travels around the circumference of the casing. The deformation can be transmitted to adjacent casings joined to the fan causing damage and/or failure of the adjacent casing.

One of the casings that may be attached to the fan casing is the inlet barrel that connects between the inlet lip of the nacelle and the fan case. The inlet barrel bounds the upstream portion of the duct that supplies air to the fan and may be formed of metal e.g. aluminium or a composite of a glass, or carbon fibre embedded in a resinous binder.

The casings are attached in an end to end relationship i.e. together they provide a wall or part of a wall of a tube or annulus. One or more intermediate components e.g. shims, gaskets, spacers etc. may be located between the casings It is an object of the present disclosure to seek to provide an improved joint between adjacent casings that seeks to address these and other problems.

According to a first aspect of the disclosure there is provided a joint assembly between a first gas turbine engine casing and a second gas turbine casing arranged end to end, the first gas turbine engine casing having a plurality of circumferentially spaced attachment points and the second gas turbine casing having a plurality of circumferentially spaced attachment points for securing the first gas turbine casing and the second gas turbine casing together in an end to end relationship, wherein each attachment point on the first gas turbine casing is circumferentially offset from a respective attachment point on the second gas turbine casing, and connected by a flexure member that permits limited relative movement of the attachment point on the first gas turbine engine casing and its respective attachment point on the second gas turbine casing.

The flexure member has a predetermined elastic and plastic deformation characteristic, that helps to determine the relative movement between the casings. The flexibility may be affected by the elasticity of the material used for the flexure member, the length of the flexure member, the thickness of the flexure member and the profile of the flexure member. Various materials may be used. Within the normal flight envelope the deformation of the flexure member is preferably within its elastic region. Outside the normal flight envelope the flexure member can deform under plastic deformation and reduce the risk of the flexure member breaking Preferably the first gas turbine casing has a flange and the plurality of circumferentially spaced attachment points are located in the flange. The flange may be located along one edge of the casing to provide stiffness. Preferably the circumferentially spaced attachment points are holes for receiving a bolt. Other attachment points e.g. weld locations may also be used as appropriate.

Preferably the flexure member comprises an arm having a proximal end integrally formed with the second gas turbine engine casing and a distal end joined to an attachment point in the flange of the first gas turbine casing. The flange and the flexure members may be formed separately and subsequently attached to the casing or the flange and the flexure members are formed integrally with the casing. Alternatively, the flange may be formed integrally with the casing and the flexure members subsequently attached. The flexure members may be formed by machining the flange or they may be formed by an additive manufacture technique in which powder is deposited into a melt pool formed by a laser or in which a layer of powder is traversed by a laser and selectively sintered to form a consolidated component.

Preferably the flexure member curves between its proximal end on the flange and its distal end. The curvature helps to control the flexibility and reduce the peak stress levels that may be observed by the relative movement of the casings.

The bolting point of the flexible member is minimally distant from the remaining flange for the value of the predicted amplitude of the sinusoidal wave in FBO event, leaving enough space for bended flexible member not to get in contact with the rest of the flange when sinus wave passing by.

Preferably the distal end of the flexure member is joined to an attachment point in the flange of the first gas turbine casing by a bolt. The may extend through the attachment point in the flange and an attachment point in the further casing and be secured with a nut.

Preferably the second gas turbine casing has a flange and the plurality of circumferentially spaced attachment points are located in the flange.

The flexure member may comprise a link arm joined by a first pin to an attachment point of the first gas turbine casing flange and by a second pin to an attachment point of the second gas turbine casing flange.

Preferably the link arm can pivot about both the first pin and the second pin to allow relative radial movement between the first casing and the second casing.

The first gas turbine casing flange may have a scalloped or trapezoidal profile. This provides a space around the link arm that allows the limited relative movement without the link arm contacting the flange. The base of the profile provides a travel stop for the link arm preventing movement beyond a relative maximum.

The second gas turbine casing flange may have a scalloped or trapezoidal profile. This has the effect of reducing the weight of the flange.

Preferably either the first or second gas turbine casing is a fan casing. Preferably either the first or second gas turbine casing is a nacelle inlet barrel.

The invention will now be described by way of example only and with reference to the accompanying drawings in which.

Figure 2:
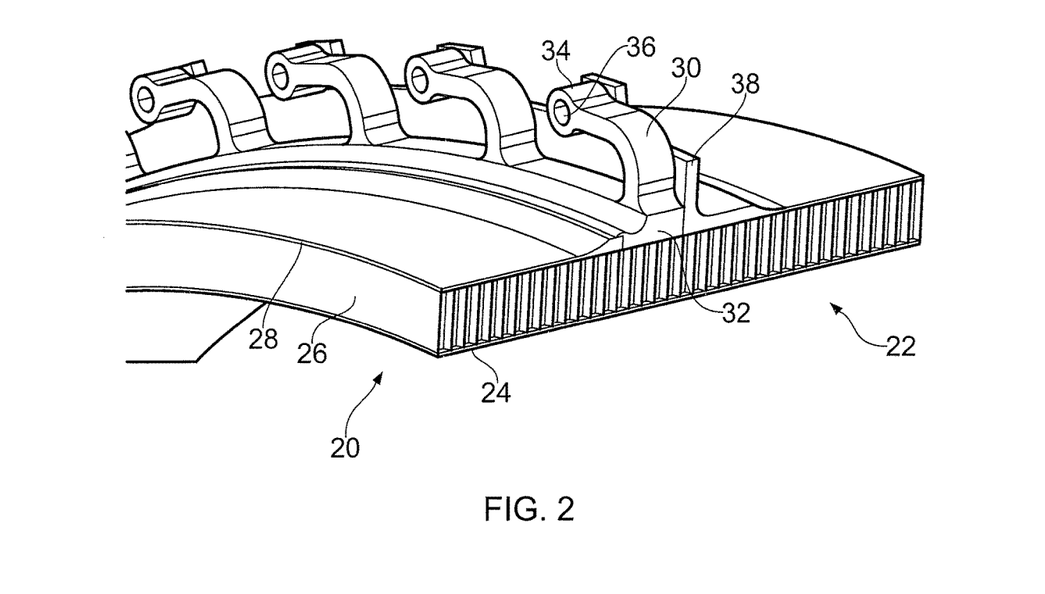
FIG. 2 depicts a joint between a fan casing 20 and an inlet barrel 22 of a gas turbine.
Figure 3:
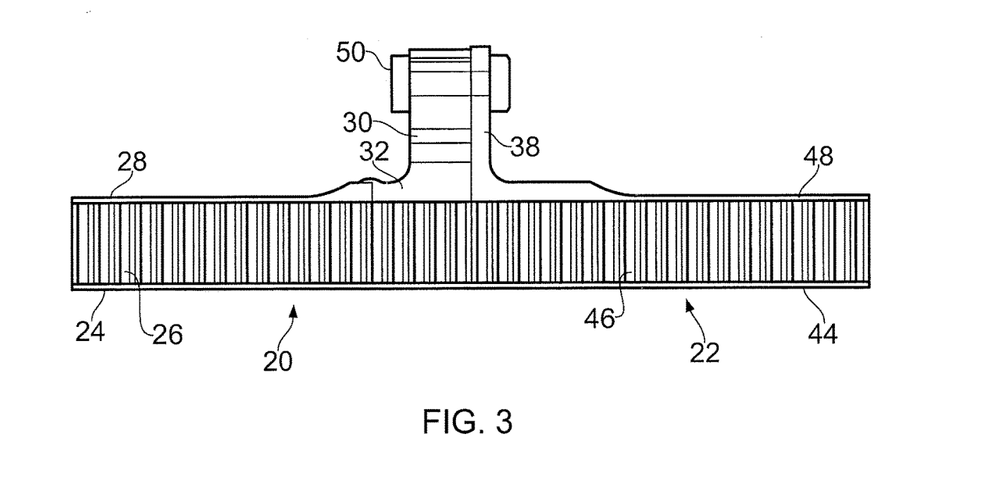
FIG. 3 is a cross-section of the joint depicted in FIG. 2.

FIGS. 2 and 3 depict a joint between a fan casing 20 and an inlet barrel 22. The fan casing and the inlet barrel together define a duct which supplies air to the fan section 2 of the gas turbine. The casing and the barrel are connected together in an end to end relationship that provides a smooth outer surface to the duct.

The fan case has a radially inner wall 24 which has an abradable liner that ensures a close fit between the rotating fan blade tip as it passes over the surface. An impact absorbing material 26 which preferably also has noise absorbing properties is secured on the inner wall and a metallic or composite outer wall 28 sandwiches the noise and impact absorbing material.

A flange 32 that protrudes from the outer surface is welded to, joined to, or otherwise integrally forms with the outer wall 28 to add structural stiffness around the edge of the casing and provide a connection feature for a neighbouring casing. From the flange a plurality of link arms 30 protrude which have a proximal end integrally formed with the flange and a distal end 34 that has a feature such as an eyelet or aperture 36 through which an attachment feature such as a bolt may be inserted to join the fan case with the inlet barrel 22.

The flange and link arms may be formed from any known technique, for example direct laser deposition involving sequential deposition and cooling of powder blown into a melt pool formed by directing a laser at a surface, by selective laser sintering involving a bed of powder over which a laser traverses to melt particles together in a layer before the bed is indexed, a new layer formed and the laser selectively traversed to melt and thereby join the layers together, or by laser or water-jet cutting, machining using a milling or grinding tool.

The link arms 30 are curved such that the proximal and distal ends are circumferentially offset. The circumferential offset allows the link arm to act as a spring, the stiffness of which may be determined by one or more of the material used to form the link arm, the dimensions such as the thickness or length of the arm, or the distance of the circumferential offset between the proximal or distal ends.

The inlet barrel 22 has a radially inner wall 44 and a radially outer wall 48 that sandwich a noise reducing filling 46, such as a honeycomb or other material conventionally used in the art. The inlet barrel also has a flange 38 which protrudes from its outer surface. The flange has an array of apertures that are circumferentially aligned with the apertures 36 in the distal end of the link arms 30 and thereby circumferentially offset from the proximal end of the link arms.

The inlet barrel flange and the link arms have respective aft and forward surfaces that can abut each other in close contact. A bolt 50 is inserted through the aperture in the link arms and the aperture in the inlet barrel flange to secure the fan casing and the inlet barrel together.

Figure 4:
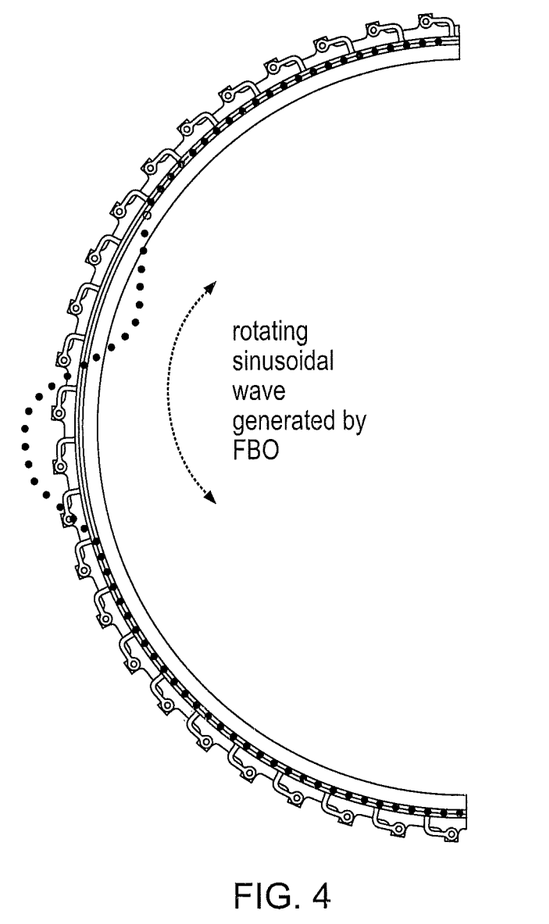
FIG. 4 is a cross-section across the axis of the engine depicting a travelling sinusoidal wave caused by a fan blade off incident.
Figure 5:
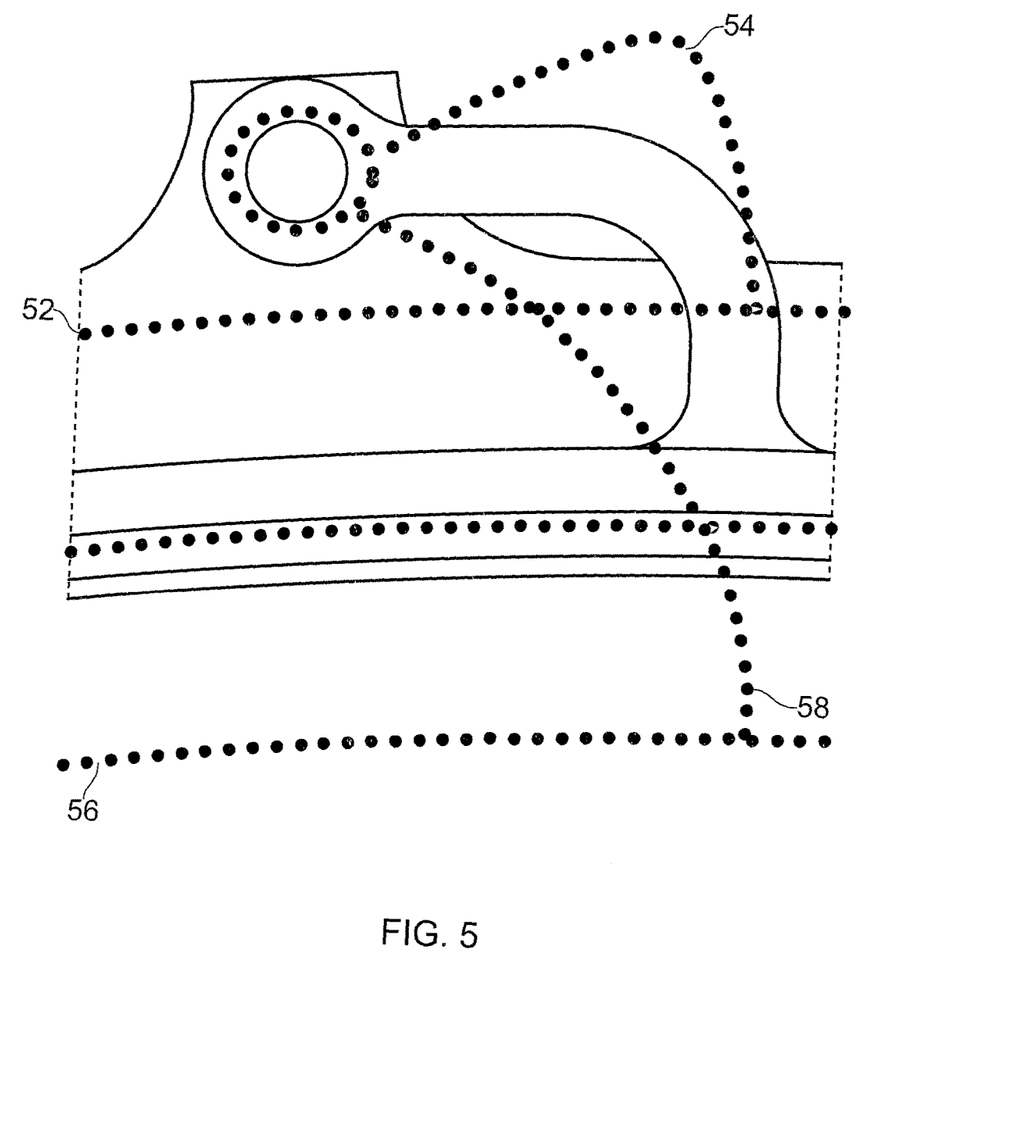
FIG. 5 depicts the relative movement of the fan case relative to the inlet barrel and the relative positions of the link arms in each position.

As shown in FIG. 4 and FIG. 5 the link arms are selected to allow limited relative movement between the fan casing and the inlet barrel in the unlikely event of fan blade off, which may occur in serious cases of bird strike or other engine ingestion events. The link arm shape allows both movement to straighten the curve of the arm and movement to increase the curve of the arm depending on the movement of the rotating sinusoidal wave that may be generated in the event of a fan blade off.

At some point in the travelling wave the fan case may move radially outside the radial line of the inlet barrel in which case the curve of the arm will tighten. At other points in the travelling wave the fan case may move inside the radial line of the inlet barrel in which case the curve of the link arm will straighten. The spring nature of the link arm is sufficient to permit the arm to sequentially straighten and curve as required to accommodate the travelling wave.

Shown in FIG. 5 is the usual position of the link arm in use but also depicted in a series of dotted lines are the nominal positions 52 of the fan casing when it travels radially outwardly with respect to the inlet barrel and the nominal position of the link arm 54 as it flexes to accommodate the relative movement of the fan case and the inlet barrel.

Also shown in FIG. 5 is the nominal position 56 of the fan casing when it travels radially inwardly with respect to the inlet barrel and the nominal position of the link arm 58 as it flexes to accommodate the relative movement of the fan case and the inlet barrel.

It will be appreciated that at all times in this event the two cases are safely secured together with minimal risk of separation with the flexibility in the arms also serving to reduce loads on the bolt to decrease the opportunity of the bolt shearing and releasing unconstrained parts into the engine where further damage could occur.

Figure 6:
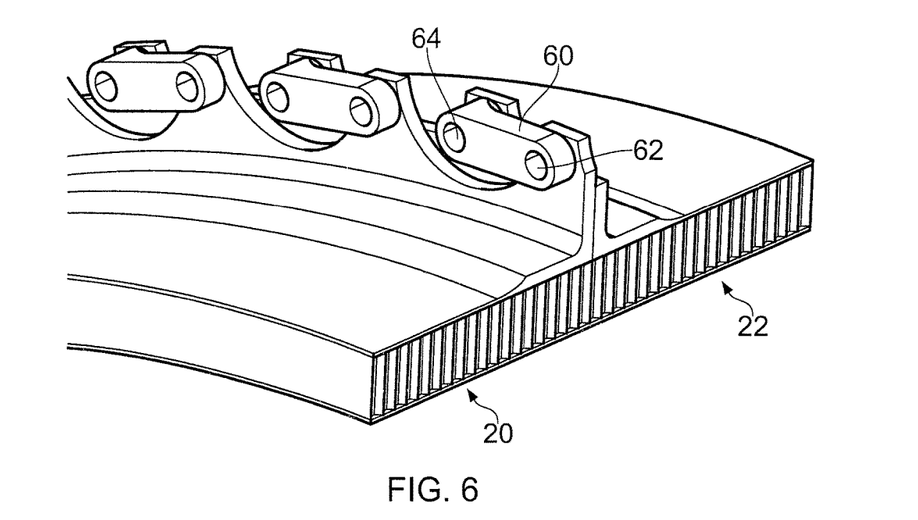
FIG. 6 depicts an alternative link arm arrangement.

In an alternative arrangement, shown in FIG. 6, the link arms 60 are separate components mounted through pivot joints 62, 64 to each of the fan case and the nacelle inlet barrel. The flange on the fan case has a scalloped profile 66 with a series of hemispherical, or other appropriate shape, cut-outs with a minima at the corresponding circumferential location of the attachment point in the inlet barrel. As will be described later, this allows for the maximum travel of the link arm and relative radial movement of the attachment point on the fan casing and inlet barrel.

Figure 7:
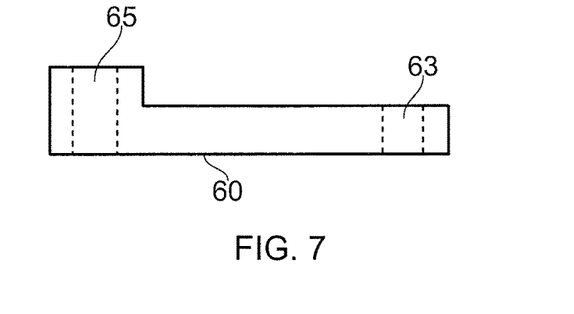
FIG. 7 depicts a cross-section of the link arm of FIG. 6.

The link arm is depicted in FIG. 7 and is elongate with the attachment features being bores 63, 65 extending through the arm from one side to the other side with an axis that is normal to the direction of elongation of the link arm. The attachment features are located at either end of the link arm. One end of the link arm is thickened in the direction in which the axis of the attachment feature extends and normal to the direction of elongation. This gives the link arm an "L" shaped profile. The difference between the length of the short arm and the thickness of the long arm is the same as the thickness of the flange of the axial direction of the engine. This permits one side of the link arm to be placed against both the flange of the fan case and the flange of the inlet barrel.

Other arrangements for the link arm could be used. For example, the arm may not be "L" shaped, but linear with the thickness of the fan case flange being accommodated by a washer or an extension on the flange of the inlet barrel which thickens the flange at its respective attachment point. The flange of the inlet barrel need not be scalloped.

Figure 8:
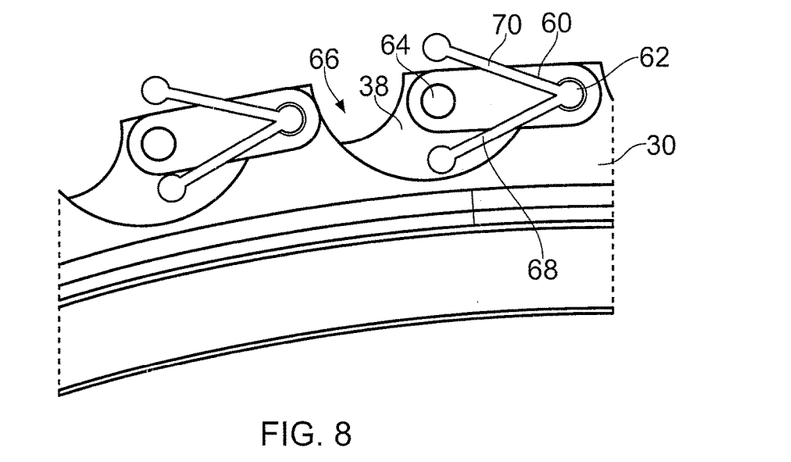
FIG. 8 depicts the relative positions of the link arms on relative movement of the fan case and the inlet barrel.

As shown in FIG. 8 the link arm pivots about its respective attachment points 62, 64 to permit limited relative radial movement between the fan case and the inlet barrel of the nacelle. The scallop of the fan case flange is sized to provide a minimum clearance for most circumstances but also a limit stop in serious cases of relative travel between the fan case and the inlet barrel.

The line 68 shows the position of the link arm when the fan case moves radially outwardly with respect to the inlet barrel. The line 70 shows the position of the link arm when the fan case moves radially outwardly with respect to the inlet barrel.

Although the invention has been described with respect to a joint between a fan case and an inlet barrel of a gas turbine nacelle it will be appreciated that it is applicable to other joints where radial movement between components, or axial movement from a plane, need to be accommodated. Within the field of gas turbines the joint may also be used between components with big differential thermal expansions and where there is a high level of vibration. For example, brackets supporting cooling manifolds or brackets supporting fairings in the turbine section.

The invention claimed is:

1. A joint assembly between a first gas turbine engine casing and a second gas turbine casing arranged end to end, the first gas turbine engine casing having a plurality of circumferentially spaced attachment points and the second gas turbine casing having a plurality of circumferentially spaced attachment points for securing the first gas turbine casing and the second gas turbine casing together in an end to end relationship, wherein each attachment point on the first gas turbine casing is circumferentially offset from a respective attachment point on the second gas turbine casing and connected by a flexure member that permits limited relative movement between the attachment point on the first gas turbine engine casing and the respective attachment point on the second gas turbine casing.

2. The joint assembly according to claim 1, wherein the first gas turbine casing has a flange and the plurality of circumferentially spaced attachment points are located in the flange.

3. The joint assembly according to claim 2, wherein the circumferentially spaced attachment points are holes for receiving a bolt.

4. The joint assembly according to claim 2, wherein the flexure member comprises an arm having a proximal end integrally formed with the second gas turbine engine casing and a distal end joined to an attachment point in the flange of the first gas turbine casing.

5. The joint assembly according to claim 4, wherein the flexure member curves between its proximal end and its distal end.

6. The joint assembly according to claim 4, wherein the distal end of the flexure member is joined to an attachment point in the flange of the first gas turbine casing by a bolt.

7. The joint assembly according to claim 5, wherein the distal end of the flexure member is joined to an attachment point in the flange of the first gas turbine casing by a bolt.

8. The joint assembly according to claim 2, wherein the second gas turbine casing has a flange and the plurality of circumferentially spaced attachment points are located in the flange.

9. The joint assembly according to claim 8, wherein the flexure member comprises a link arm joined by a first pin to an attachment point of the first gas turbine casing flange and by a second pin to an attachment point of the second gas turbine casing flange.

10. The joint assembly according to claim 9, wherein the link arm can pivot about both the first pin and the second pin.

11. The joint assembly according to claim 8, wherein the first gas turbine casing flange has a scalloped or trapezoidal profile.

12. The joint assembly according to claim 11, wherein the second gas turbine casing flange has a scalloped or trapezoidal profile.

13. The joint assembly according to claim 1, wherein either the first or second gas turbine casing is a fan casing.

14. The joint assembly according to claim 13, wherein the other of the first or second gas turbine casing is an inlet nacelle barrel of a gas turbine engine.

15. A joint assembly between a first gas turbine engine casing and a second gas turbine casing in an abutting relationship, the first gas turbine engine casing having a plurality of circumferentially spaced attachment points and the second gas turbine casing having a plurality of circumferentially spaced attachment points for securing the first gas turbine casing and the second gas turbine casing together, wherein each attachment point on the first gas turbine casing is circumferentially offset from a respective attachment point on the second gas turbine casing and connected by a flexure member that permits limited relative movement between the attachment point on the first gas turbine engine casing and the respective attachment point on the second gas turbine casing.

16. The joint assembly according to claim 15, wherein the flexure member comprises an arm having a proximal end integrally formed with the second gas turbine engine casing and a distal end joined to an attachment point in a flange of the first gas turbine casing.

17. The joint assembly according to claim 15, wherein the second gas turbine casing has a flange and the plurality of circumferentially spaced attachment points are located in the flange.

18. The joint assembly according to claim 17, wherein the flexure member comprises a link arm joined by a first pin to an attachment point of a first gas turbine casing flange and by a second pin to an attachment point of the second gas turbine casing flange.

19. An arrangement of a gas turbine fan casing and an inlet nacelle barrel of a gas turbine engine, the fan casing having a plurality of circumferentially spaced attachment points and the inlet nacelle barrel having a plurality of circumferentially spaced attachment points, wherein each attachment point on the fan casing is circumferentially offset from a respective attachment point on the inlet nacelle barrel and connected by a flexure member that permits limited relative movement between the attachment point on the fan casing and the respective attachment point on the inlet nacelle barrel.

20. The arrangement according to claim 19, wherein the fan casing has a flange and the plurality of circumferentially spaced attachment points are located in the flange and the flexure member comprises an arm having a proximal end integrally formed with the nacelle inlet barrel and a distal end joined to an attachment point in the flange of the fan casing.

* * * * *